(12) United States Patent
Venskus et al.

(10) Patent No.: US 8,914,979 B2
(45) Date of Patent: Dec. 23, 2014

(54) SYSTEM AND METHOD FOR ASSEMBLING AIRCRAFT COMPONENTS

(75) Inventors: Mark Kenyon Venskus, Derby, KS (US); Troy Lynn Wampler, Derby, KS (US); Stephen Eldred Walters, Wichita, KS (US); Clark Ray Miller, Wichita, KS (US); Michael Arthur Champa, Clearwater, KS (US); Edwin H. Fenn, Wichita, KS (US); David Scott Anderson, Derby, KS (US)

(73) Assignee: Spirit AcroSystems, Inc., Wichita, KS (US)

( * ) Notice: Subject to any disclaimer, the term of this patent is extended or adjusted under 35 U.S.C. 154(b) by 561 days.

(21) Appl. No.: 13/553,946

(22) Filed: Jul. 20, 2012

(65) Prior Publication Data

US 2013/0019446 A1    Jan. 24, 2013

Related U.S. Application Data

(60) Provisional application No. 61/510,133, filed on Jul. 21, 2011.

(51) Int. Cl.
*B21D 53/88*   (2006.01)
*B23Q 1/01*    (2006.01)
*B64C 1/06*    (2006.01)
*B23Q 3/06*    (2006.01)

(52) U.S. Cl.
CPC .............. *B23Q 1/012* (2013.01); *B64C 1/068* (2013.01); *B23Q 3/062* (2013.01)
USPC ............... 29/897.2; 29/897; 29/428; 29/432; 29/462; 29/464; 29/281.1; 29/281.5; 29/281.6

(58) Field of Classification Search
USPC ........ 29/897, 897.2, 428, 432, 462, 464, 469, 29/281.1, 281.4, 281.5, 281.6
See application file for complete search history.

(56) References Cited

U.S. PATENT DOCUMENTS

| | | | | |
|---|---|---|---|---|
| 5,694,690 A * | 12/1997 | Micale | .......................... | 29/897.2 |
| 6,073,326 A * | 6/2000 | Banks et al. | ................... | 29/34 B |
| 6,481,096 B2 * | 11/2002 | Lehmker et al. | ................ | 29/721 |
| 6,598,866 B2 * | 7/2003 | Helm et al. | ...................... | 269/21 |
| 7,003,860 B2 * | 2/2006 | Bloch et al. | ................... | 29/407.1 |
| 7,624,488 B2 * | 12/2009 | Lum et al. | ..................... | 29/281.5 |
| 7,657,988 B2 * | 2/2010 | Greene | .......................... | 29/464 |
| 8,146,222 B2 * | 4/2012 | Frauen et al. | ................. | 29/281.1 |
| 8,266,778 B2 * | 9/2012 | Neuhaus et al. | ................ | 29/429 |
| 8,272,118 B2 * | 9/2012 | Alvez | ......................... | 29/525.06 |
| 8,286,323 B2 * | 10/2012 | Toh et al. | .................... | 29/525.01 |
| 8,302,312 B2 * | 11/2012 | Stephan | ....................... | 29/897.2 |
| 8,430,362 B2 * | 4/2013 | Graeber et al. | ............... | 244/185 |
| 8,468,699 B2 * | 6/2013 | Frauen et al. | ................. | 29/897.2 |
| 8,484,848 B2 * | 7/2013 | Gallant et al. | ............... | 29/897.2 |
| 8,695,219 B2 * | 4/2014 | Munk et al. | ................... | 29/897.2 |

* cited by examiner

*Primary Examiner* — Richard Chang
(74) *Attorney, Agent, or Firm* — Hovey Williams LLP

(57) ABSTRACT

A system and method for assembling a 360-degree section of an aircraft fuselage or nacelle by properly positioning a plurality of assembly panels relative to a machine datum representing an assembly-level datum schema, drilling full-sized holes proximate to a second skin edge of the panels with the machine, net-trimming a second edge of the panels with the machine, then using the full-sized holes proximate to the second skin edges as alignment features to properly orient and attach pairs of the panels together proximate to first skin edges, opposite of the second skin edges with an auxiliary machine, forming panel pairs. Control systems may be installed into the panel pairs separately and independently, then the panel pairs may be joined together, aligning the full-sized holes proximate to the second edges, and inserting fasteners through the aligned full-sized holes proximate to the second skin edges.

20 Claims, 10 Drawing Sheets

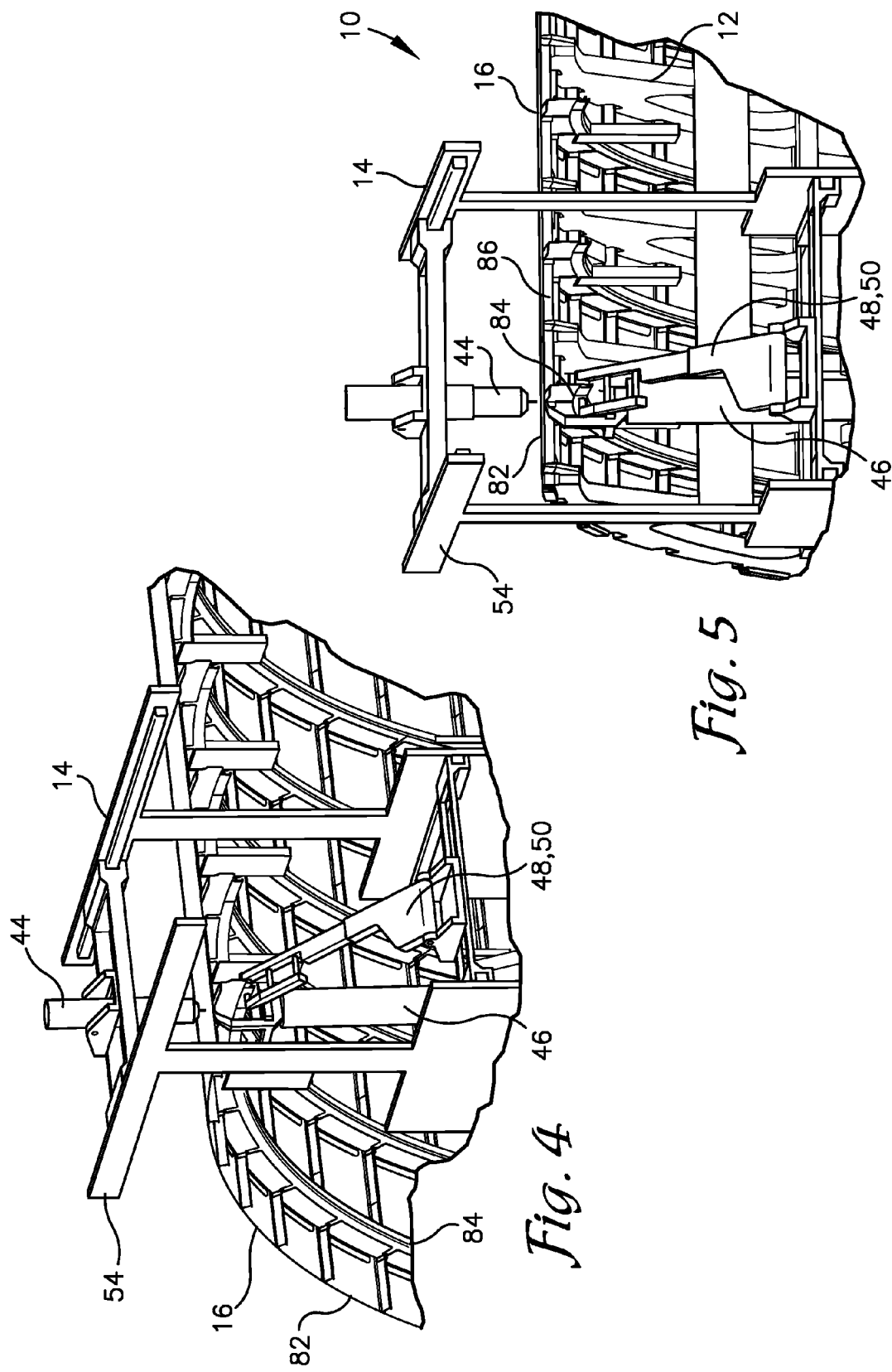

SYSTEM AND METHOD FOR ASSEMBLING AIRCRAFT COMPONENTS

RELATED APPLICATIONS

The present application is a non-provisional utility application claiming priority benefit to U.S. Application Ser. No. 61/510,133 entitled Envelope Coordinate System that Integrates Multiple Dissimilar Coordinate Protocols, of Machine, Tool, and Part, to Produce Spatially Separated Matched Holes, filed Jul. 21, 2011 and incorporated by reference herein in its entirety.

BACKGROUND

In aircraft manufacturing and more specifically fuselage manufacturing, a large number of components must be joined together, generally by the use of bolts or other fasteners inserted through aligned holes of various mating components. For example, multiple cured fuselage skins, frames, and stringers may be joined to form a single 360-degree section of the fuselage. Multiple 360-degree sections may be joined length-wise to form a complete fuselage. Because of the large size of these components, and the tight tolerance requirements of the fuselage, it is common for alignment errors to occur during different steps of assembling the 360-degree fuselage sections.

To account for this, pilot holes (smaller than a diameter of the fasteners or bolts of the fuselage) are generally drilled into the multiple fuselage skins, frames, and stringers. Once these various components are brought together to form the single 360-degree fuselage section, the components are fixed relative to each other via some of the pilot holes before full-sized holes for the fasteners are drilled through overlapping sections of the skins, frames, and stringers. Thus, the pilot holes do not each have to match exactly, since they are replaced with full-sized holes once the parts are all brought together for assembly. Any required trimming of the various fuselage skins, frames, and stringers may also be performed during assembly of the 360-degree fuselage section, as needed.

The drilling of pilot holes followed by the later drilling of full-sized holes is inefficient. However, current determinant assembly technology alone is not precise enough to allow full-sized holes to be drilled into spatially separated individual fuselage parts with enough accuracy to match mating holes within the desired tolerance range during fuselage assembly.

Furthermore, an entire 360-degree fuselage section must generally be assembled before various control systems can be installed therein, because drilling holes within the fuselage skin, frames, and stringers for attachment creates byproduct which can contaminate the control systems. Thus, the fuselage is generally assembled into complete 360-degree fuselage sections, then the byproduct from the drilling of the full-sized holes for the fasteners is washed out, and then the control systems are installed. This requires multiple installers in cramped-quarters to install the control systems inside of the completed fuselage. In particular, the cargo bin between the bottom of the fuselage and the aircraft's floor can be fairly small and provides limited space in which an installer can work.

Accordingly, there is a need for an improved method aircraft assembly that overcomes the limitations of the prior art.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Embodiments of the present invention solve the above-mentioned problems and provide a distinct advantage in the art of aircraft fuselage or nacelle assembly. More particularly, embodiments of the present invention provide a method of manufacturing a 360-degree segment of an aircraft structure. Specifically, the method may include the steps of assembling a plurality of panels comprising skins, stringers, and frames each panel having a first skin edge and a second skin edge opposite of the first skin edge, and forming locating holes or locating features at a predetermined location proximate to the first skin edge. The method may also include the step of placing at least two of the panels, spatially separated from each other, on a support tool such that the locating holes or locating features align with indexing features of the support tool. The indexing features of the support tool may be oriented with a datum of a machine configured to machine the panels.

Next, the method may include the step of drilling a plurality of full-sized holes proximate to the second skin edges of the at least two panels with the machine, using the datum of the machine as a reference point. The full-sized holes may have a diameter corresponding with a diameter of fasteners to be placed through the full-sized holes. The steps of placing and drilling at least two of the panels may be repeated for the remaining panels of the plurality of panels.

The method may then include the steps of removing the panels from the support tool and overlapping two of the panels proximate to their first skin edges, using the full-sized holes proximate to the second skin edges as locating features for determining a precise positioning of the panels relative to each other. The method may further include the steps of inserting fasteners or pins through the locating holes overlapping each other proximate to the first skin edges of the panels and drilling full-sized holes through the panels simultaneously at overlapping locations of the panels and inserting corresponding fasteners into the full-sized holes, forming a pair of joined panels. The steps of overlapping two of the panels, inserting fasteners or pins through the locating holes, and drilling full-sized holes through the panels at overlapping locations may be repeated for another pair of the panels.

Finally, the method may include the steps of installing control systems into at least one of the pairs of joined panels; and attaching the two pairs of joined panels with each other. Attaching the two pairs of joined panels with each other may include aligning the full-sized holes proximate to one of the second skin edges with the full-sized holes proximate to another of the second skin edges and corresponding frame ends, then inserting fasteners through the aligned full-sized holes.

Another embodiment of the invention provides a method of manufacturing a 360-degree segment of an aircraft structure including the steps of assembling a plurality of panels comprising skin(s), stringers, and frames, each panel having a first skin edge and a second skin edge opposite of the first skin edge, and net trimming the panels on all but the second skin edge. The method also includes the steps of forming locating holes or locating features at a predetermined location proximate to the first skin edge and placing at least two of the panels on separate portions of a support tool such that the locating holes or locating features align with indexing features of the support tool. The separate portions of the support tool may include a first portion and a second portion, and the indexing features of the support tool may be oriented with a datum of a machine configured to machine the panels. The first and second portions of the support tool may be spatially separated from each other.

The method may further include the steps of drilling a plurality of full-sized holes proximate to the second skin edges and corresponding frame ends of the at least two panels with the machine, using the datum of the machine as a reference point, and trimming the second skin edges of the at least two panels with the machining, using the datum of the machine as a reference point. The full-sized holes may have a diameter corresponding with a diameter of fasteners to be placed through the full-sized holes. The method may also include repeating the steps of placing the panels on the support tool, drilling the full-sized holes, and trimming the second skin edges for two others of the panels.

The method may then include the steps of removing the panels from the support tool and overlapping two of the panels proximate to their first skin edges using the full-sized holes proximate to the second skin edges as locating features for determining a precise positioning of the panels relative to each other. The method may also include the steps of inserting fasteners or pins through the locating holes overlapping each other proximate to the first skin edges of the panels and drilling full-sized holes through the panels simultaneously at overlapping locations of the panels and inserting corresponding fasteners into the full-sized holes. The steps of overlapping two of the panels, inserting fasteners or pins through the locating holes, and drilling full-sized holes through the overlapping locations of the panels may be repeated for two others of the panels, such that two pairs of joined panels are formed.

The method may then include the steps of installing control systems into at least one of the pairs of joined panels, and attaching the two pairs of joined panels with each other. Attaching the two pairs of joined panels may include the steps of overlapping the second skin edges such that the full-sized holes proximate to one of the second skin edges are aligned with the full-sized holes proximate to another of the second skin edges and corresponding frame ends, then inserting fasteners through the aligned full-sized holes.

Yet another embodiment of the invention provides method of manufacturing a 360-degree segment of an aircraft fuselage, including the steps of assembling four quarter panels comprising skin(s), stringers, and frames, each quarter panel having a first skin edge and a second skin edge opposite of the first skin edge, and net trimming the quarter panels on all but the second skin edge. The quarter panels may include an upper right quarter panel, a lower right quarter panel, an upper left quarter panel, and a lower left quarter panel.

The method may further include the steps of forming locating holes or locating features at a predetermined location proximate to the first skin edge and placing the upper right quarter panel and the lower right quarter panel on first and second portions of a support tool such that the locating holes or locating features align with indexing features of the support tool. The indexing features of the support tool may be oriented with a datum of a machine configured to machine the panels. The first and second portions of the support tool may be spatially separated from each other such the second skin edges of the upper and lower right quarter panels are spatially separated from each other.

The method may also include the steps of drilling a plurality of full-sized holes proximate to the second skin edges and corresponding frame ends of the upper and lower right quarter panels, with the machine, and trimming the second skin edges of the upper and lower right quarter panels with the machine, using the datum of the machine as a reference point. The full-sized holes may have a diameter corresponding with a diameter of fasteners to be placed through the full-sized holes. The method may include the steps of placing the upper left quarter panel and the lower left quarter panel on third and fourth portions of the support tool, or alternatively placing the upper left quarter panel and the lower left quarter panel on the first and second portions of the support tool after removing the upper and lower right quarter panels from the first and second portions of the support tool.

The method may then include the steps of aligning locating holes or locating features with the indexing features of the support tool, drilling a plurality of full-sized holes proximate to the second skin edges of the upper and lower left quarter panels with the machine, using the datum of the machine as a reference point, and trimming the second skin edges of the upper and lower left quarter panels with the machine, using the datum of the machine as a reference point. The third and fourth portions of the support tool may be spatially separated from each other such that the second skin edges of the upper and lower left quarter panels are spatially separated from each other if supported by the third and fourth portions of the support tool.

The method steps may further include removing the quarter panels from the support tool and overlapping a portion of the upper left quarter panel with the upper right quarter panel proximate to their first skin edges, using the full-sized holes proximate to the second skin edges as locating features for determining a precise positioning of the upper right and left quarter panels relative to each other. The method may then include the steps of inserting fasteners or pins through the locating holes of the upper left and right quarter panels overlapping each other proximate to the first skin edges of the upper left and right quarter panels, then drilling full-sized holes through the upper right and left quarter panels simultaneously at overlapping locations of the upper right and left quarter panels and inserting corresponding fasteners into the full-sized holes at the overlapping locations of the upper right and left quarter panels, forming an upper half section of the fuselage.

The method may also include the step of overlapping a portion of the lower left quarter panel with the lower right quarter panel proximate to their first skin edges, using the full-sized holes proximate to the second skin edges as locating features for determining a precise positioning of the lower right and left quarter panels relative to each other. The method may then include the steps of inserting fasteners or pins through the locating holes of the lower left and right quarter panels overlapping each other proximate to the first skin edges of the lower left and right quarter panels and drilling full-sized holes through the lower right and left quarter panels simultaneously at overlapping locations of the lower right and left quarter panels, then inserting corresponding fasteners into the full-sized holes at the overlapping locations of the lower right and left quarter panels, forming a lower section of the fuselage.

Finally, the method may include the steps of independently installing control systems into the upper section, the lower section, and the floor grid of the fuselage, then attaching the lower section and the floor grid with fasteners, and attaching the upper section and the lower section of the fuselage with each other by overlapping the second skin edges such that the full-sized holes proximate to one of the second skin edges are aligned with the full-sized holes proximate to another one of the second skin edges and inserting fasteners through the aligned full-sized holes.

BRIEF DESCRIPTION OF THE DRAWING FIGURES

Preferred embodiments of the present invention are described in detail below with reference to the attached drawing figures, wherein:

FIG. 4 is a fragmentary perspective view of one of the quarter panels of the 360-degree section, a frame located and drilled full size on a skin of the quarter panel, and machining implements of a machine of the system of FIG. 1;

FIG. 5 is a fragmentary exploded perspective view of machining implements of the machine of FIG. 4 and further depicts multiple frames and stringers attached to the skin and resting on a support tool;

Figure 1:
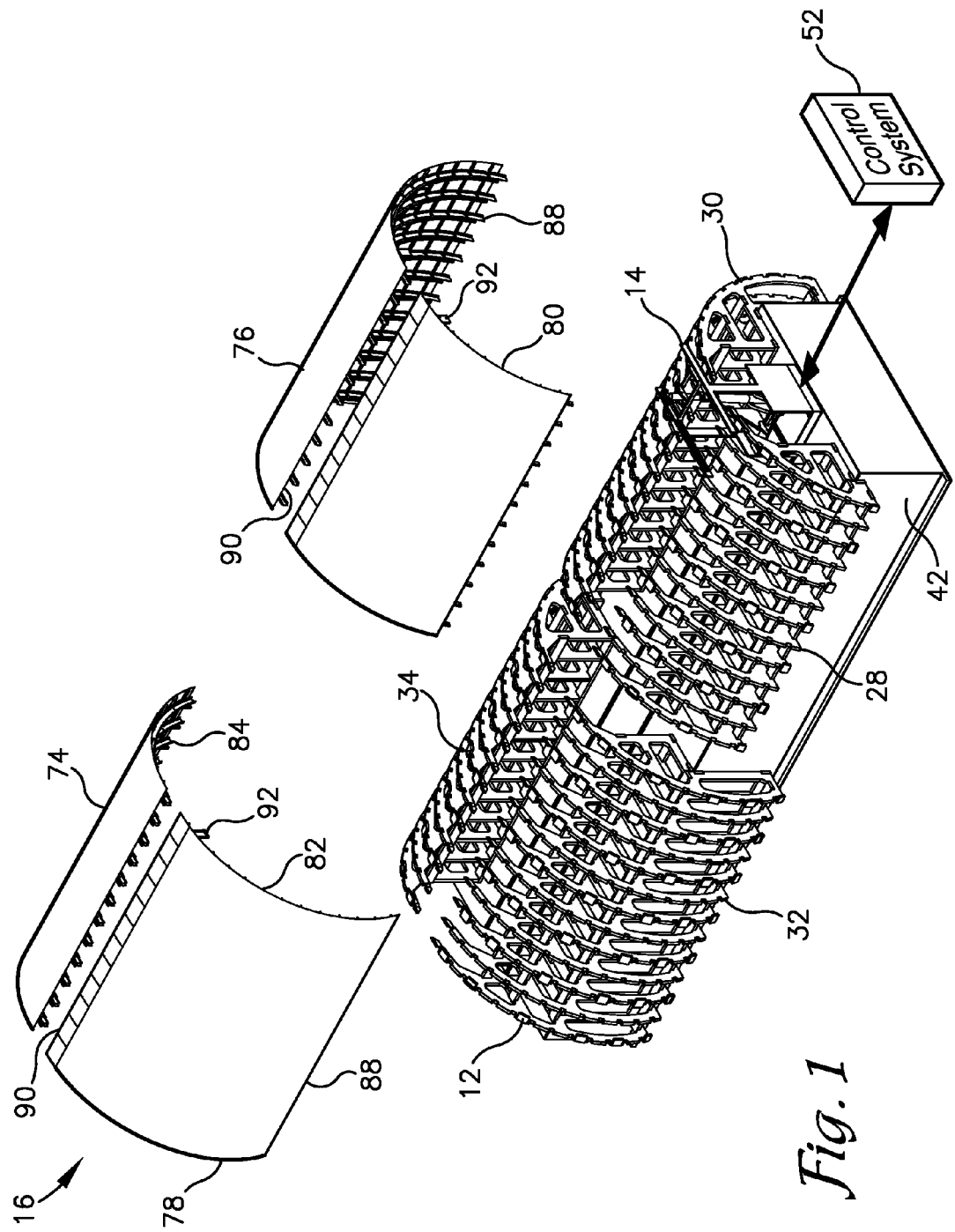
FIG. 1 is a perspective view of a system for assembling a 360-degree section of an aircraft fuselage, constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A system 10 constructed in accordance with embodiments of the present invention is shown in FIGS. 1-9 and includes at least one support tool 12, a machine 14 configured for drilling and/or trimming aircraft components 16 as described herein, and an auxiliary machine 20 configured for properly orienting, drilling, and fastening at least two of the aircraft components 16 together. The system 10 is configured for properly positioning and drilling full-sized holes 22 into aircraft components such that fasteners 24 may be later inserted through mating ones of the full-sized holes 22 of two of the aircraft components 16 to be joined together. The fasteners may be any production fasteners known in the art, such as bolts, pins, and the like. The term "full-sized holes," as used herein, refers to holes sized large enough that a corresponding fastener, such as a bolt or pin, may fit therethrough with a pre-defined minimum amount of clearance. The system 10 and method described herein may allow the full-sized holes 22 to be accurately drilled into various aircraft components prior to installing control systems (not shown) therein. Then, once control systems are installed in the aircraft components 16, the aircraft components 16 may be joined together via the fasteners 24 inserted through overlapping mating holes of the components to be joined.

Figure 3:
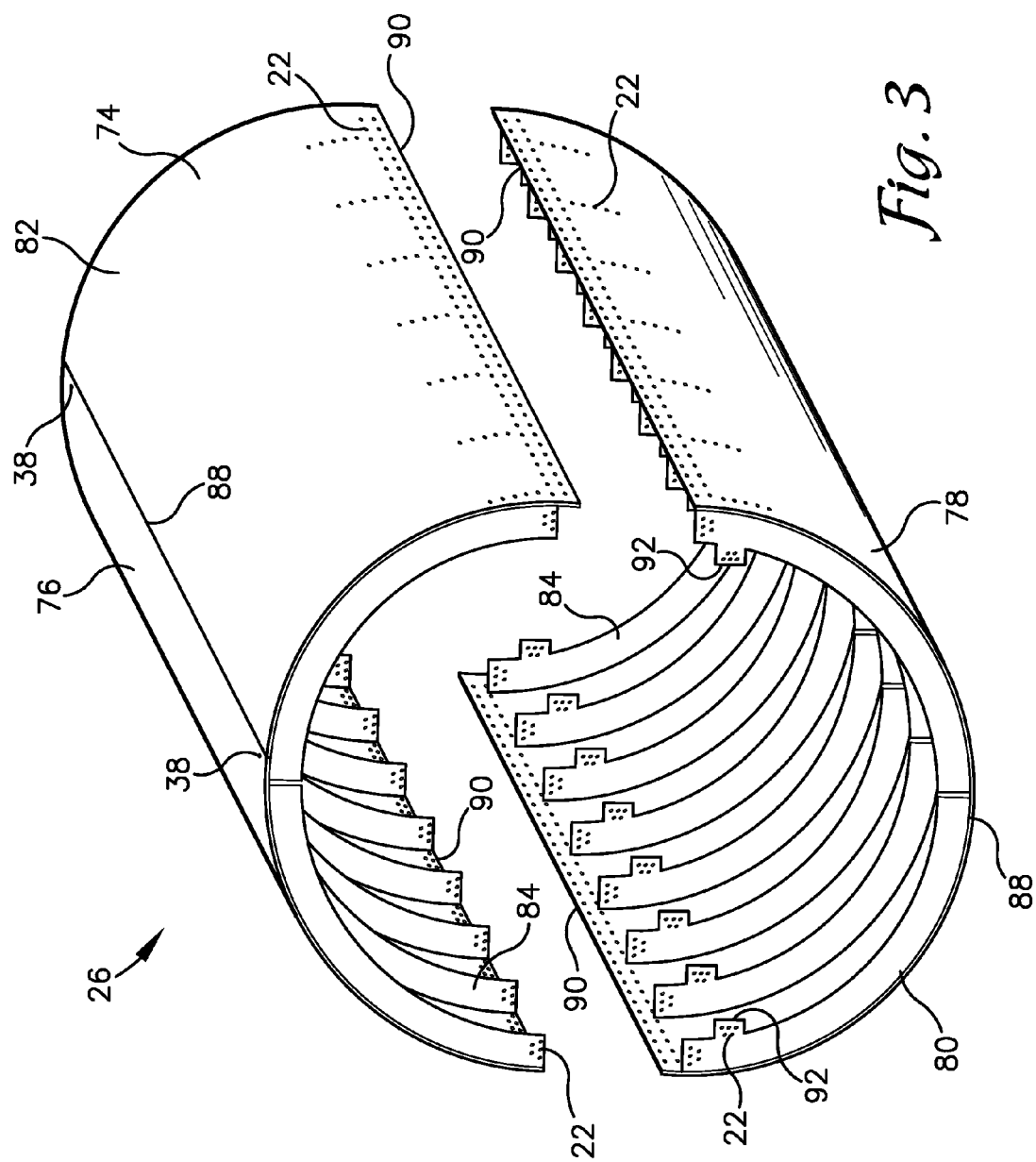
FIG. 3 is an exploded perspective view of four quarter panels of the 360-degree section of the aircraft fuselage of FIG. 1, without a floor grid, installed prior to assembly.

The support tool 12 may include one or more structures or frame-work having a shape and configuration for supporting two or more of the aircraft components 16 in place for drilling full-sized holes therein. For example, one embodiment of the support tool 12 for fuselage manufacturing may have a generally curved configuration for supporting a portion of a 360-degree section 26 of the fuselage, as illustrated in FIG. 3 (partially assembled). In some embodiments of the invention, the support tool 12 may comprise a first portion 28, a second portion 30, a third portion 32, and/or a fourth portion 34 each spatially separated from each other but positioned in close proximity to each other in a predetermined alignment relative to the machine 14, as illustrated in FIG. 1 and described later herein.

Figure 2:
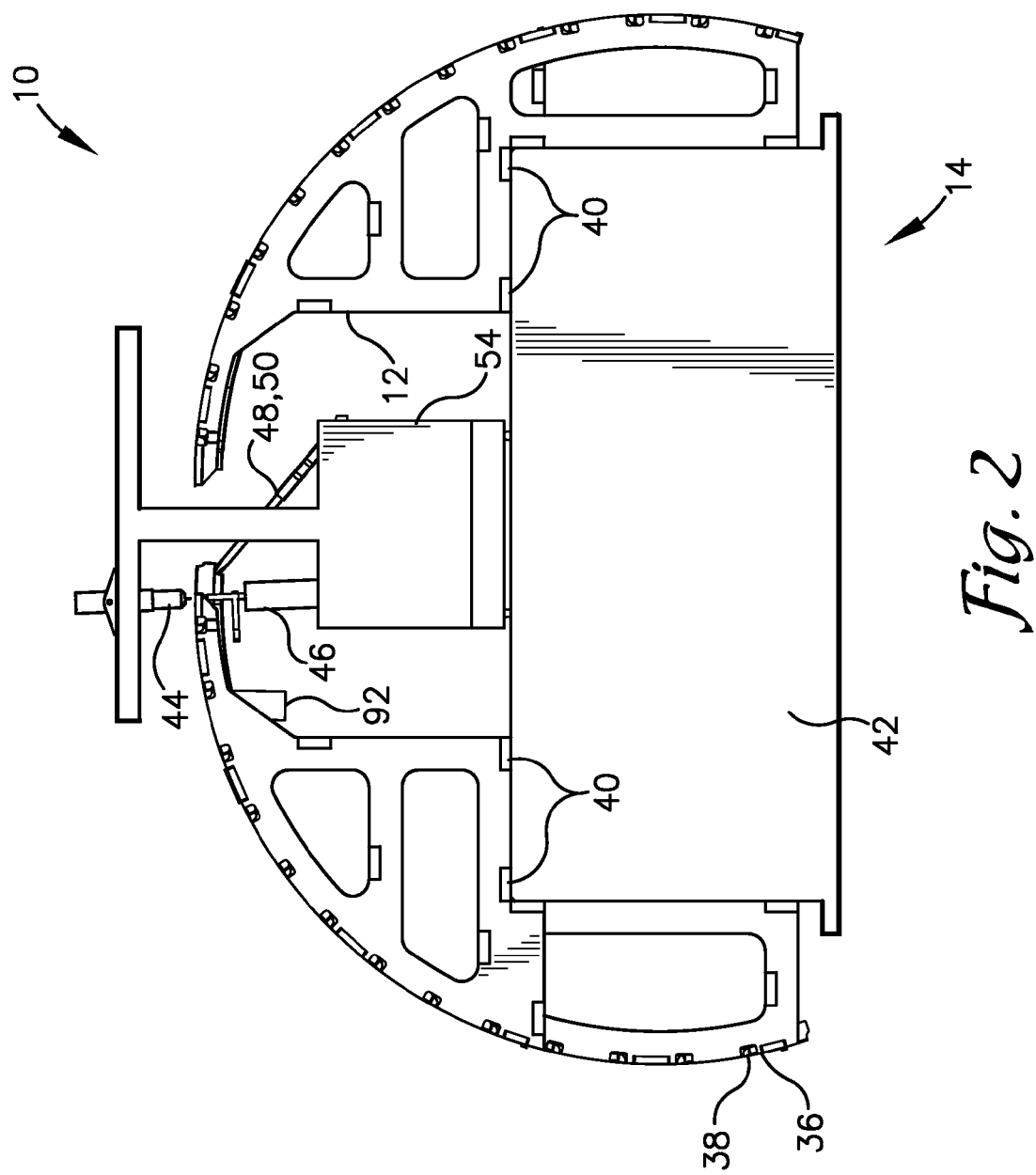
FIG. 2 is an end elevation view of the system of FIG. 1.

Furthermore, as depicted in FIG. 2, the support tool 12 may comprise one or more indexing features 36 configured to mate with locating holes 38 or other locating elements of the aircraft components 16 placed thereon, as later described herein. The support tool 12 may be configured to hold the aircraft components 16 in a particular orientation relative to the locating holes 38 and the indexing features 36. Furthermore, the support tool 12 may be configured to be positioned on and/or relative to the machine 14, such that the indexing features 36 of the support tool 12 correspond in a predictable way with a datum (coordinate origin or reference system) of the machine 14. For instance, the support tool 12 may be self-locating with a portion of the machine 14, or the machine datum may be calibrated to correspond with the indexing features 36 of the support tool 12. In one embodiment of the invention, the support tool 12 may comprise tool locating features 40 for properly locating the support tool 12 on the machine 14, as later described herein.

The machine 14 may comprise a machine bed 42, one or more machining implements 44,46,48,50, and at least one control system 52 configured for controlling motion and operation of the machining implements 44-50. The machine bed 42 may be a platform on which the support tool 12 may be supported and properly aligned. The support tool 12 should be properly aligned with a datum of the machine bed 42 and/or the machine 14, thereby calibrating the support tool 12, the aircraft components 16, and the machine 14. In some embodiments of the invention, alignment features (not shown) formed into or protruding from the machine bed 42 may be used to properly position and fix the support tool 12 to the machine bed 42. For example, the alignment features of the machine bed 42 may mate with or otherwise engage with the locating features 40 of the support tool 12. In an alternative embodiment of the invention, the support tool 12 and the machine bed 42 may be integrally-formed of one-piece and/or fixed construction with each other.

The machining implements 44-50 may comprise drilling implements 44-48, alignment implements 50, and/or trimming implements (not shown) for machining the aircraft components 16. The machine 14 may use determinant assembly (DA) analysis and methods known in the art to properly locate the machining implements 44-50 relative to the machine datum. For example, determinant assembly (DA) processes may be utilized by the machine 14 and/or the operators of the machine 14 throughout the method steps described herein to properly locate the full-sized holes 22 and trimming of the aircraft components 16. DA software may be specifically implemented by the control system 52 of the machine 14, as later described herein.

As illustrated in FIGS. 2, 4, and 5, the drilling implements 44-48 may comprise an upper skin drilling component 44, a lower skin drilling component 46, and a frame drilling component 48. The upper skin drilling component 44 may be aligned with and drill in a direction toward the lower skin drilling 46 component. For example, the lower skin drilling component 46 may provide an opposing pressure on one side of a skin of the aircraft components 16 while the upper skin drilling component 44 drills through the skin. The skin of the aircraft components being drilled may therefore be positioned between the upper and lower skin drilling components 44,46. The upper and/or lower skin drilling components 44,46 may be actuatable in a plurality of directions. For example, the upper and lower skin drilling components 44,46 may be actuated fore and aft along a length or y-axis of the machine bed 42 and aircraft components 16, may move up and down toward and away from the machine bed 42 and aircraft components 16 along a vertical or z-axis of the machine bed 42, and may move side-to-side along an x-axis of the machine bed 42. In some embodiments of the invention, the upper and lower skin drilling components 44,46 may cooperatively operate and be actuatable with up to 6-degrees of freedom.

The frame drilling component 48 may be configured to drill holes into loose ends of frames of the aircraft components 16. The frames, as later described herein, may be substantially perpendicular relative to the skin of the aircraft components 16. The frame drilling component 48 may be actuatable in a plurality of directions, just like the upper and lower skin drilling components 44,46. The upper skin drilling component 44, the lower skin drilling component 46, and the frame drilling component 48 may all travel on a single actuatable carriage 54 which may be configured to move lengthwise on the machine bed 42 between the aircraft components 16. For example, the carriage 54 supporting the drilling implements 46-48 may ride along a track attached to or formed in the machine bed 42.

The alignment implement 50 may be a positioning arm configured to grasp and properly orient the loose ends of the frames relative to the machine datum and the locating holes 38 of the aircraft components 16. The alignment implement 50 may be actuatable in a plurality of directions along a plurality of axes. The alignment implement may also travel on the same actuatable carriage 54 as the drilling components 44-48. The alignment implement 50 may specifically be configured to grasp and hold the loose ends of the frames in proper orientation while the drilling implements 44-48 drill full-sized holes through the frames and skin of the aircraft components 16. In some embodiments of the invention, the alignment implement 50 and the frame drilling component 48 may be a single integrated component and/or may be mounted on a single arm on the carriage 54, as illustrated in FIG. 4.

The trimming implements may comprise an end mill and/or a skin stabilization tool. The amount trimmed from the aircraft components may be determined based on the datum of the machine which is associated with locating holes on the aircraft components and indexing features on the support tools. The trimming implements may also travel on the same actuatable carriage 54 as the drilling components 44-48 and the alignment implement 50.

The control system 52 may comprise at least one processor and/or any number and combination of controllers, circuits, integrated circuits, programmable logic devices such as programmable logic controllers (PLC) or motion programmable logic controllers (MPLC), computers, processors, microcontrollers, other electrical and computing devices, and/or other data and signal processing devices for carrying out the functions described herein, and may additionally comprise one or more memory storage devices, transmitters, receivers, and/or communication busses and ports. The control system 52 may be configured for communication with actuators of the machine 14 for actuating the machining implements 44-50 and may also receive feedback signals from various sensors associated with the system 10. This communication may be through wires, cables, and the like or via wireless means, such as Wi-Fi or the like.

In some embodiments of the invention, the control system 52 may comprise several separate processors or computing devices. In this embodiment of the invention, the several processors or computing devices may communicate and exchange information with each other and may even be located in remote locations relative to each other. Furthermore, the several processors or computing devices may each be configured to execute different steps, algorithms, subroutines, or codes described herein.

The control system 52 may be configured to implement any combination of the algorithms, subroutines, or code corresponding to method steps and functions described herein. The control system and computer programs described herein are merely examples of computer equipment and programs that may be used to implement the present invention and may be replaced with or supplemented with other controllers and computer programs without departing from the scope of the present invention. While certain features are described as residing in the control system, the invention is not so limited, and those features may be implemented elsewhere. For example, databases accessed by the control system 52, such as aircraft component specification databases, may be located remotely by the control system 52 without departing from the scope of the invention.

In various embodiments of the invention, the control system 52 may implement a computer program and/or code segments to perform some of the functions described herein. The computer program may comprise an ordered listing of executable instructions for implementing logical functions in the control system. For example, the computer program may be a software program configured to run on a computer, such as a personal computer, laptop, tablet, or the like. The computer program can be embodied in any computer-readable medium for use by or in connection with an instruction execution system, apparatus, or device, and execute the instructions. In the context of this application, a "computer-readable medium" can be any physical means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

As noted above, the control system 52 may comprise memory storage devices or other various memory elements. The memory may include one or more memory storage devices which may be integral with the control system 52, stand alone memory, or a combination of both. The memory may include, for example, removable and non removable memory elements such as RAM, ROM, flash, magnetic, optical, USB memory devices, MMC cards, RS MMC cards, SD cards such as microSD or miniSD, SIM cards, and/or other memory elements. Specifically, the memory may store at least a portion of the computer program or code segments described above, as well as user-specified preferences, information regarding user selections, aircraft component specifications, three-dimensional computer models of various aircraft components, build datum information, and calibration information regarding locations of one or more known features of the aircraft component (e.g., locating holes), the support tool indexing features, and/or the machine's datum. Various known software programs, computer program languages, and applications may be stored in the memory of the control system 52 and/or accessed by the control system, such as CATIA, AutoCAD, determinant assembly (DA) software, and the like.

The control system 52 may be configured to receive information from a user or operator via a user interface. The user interface may comprise a mouse, keyboard, touch screen, or various data input ports whereby the user may input data directly into the control system or otherwise exchange information with the control system. Likewise, the control system 52 may comprise a display or display screen for providing visual graphics, text instructions, and other information to a user or operator.

Figure 6:
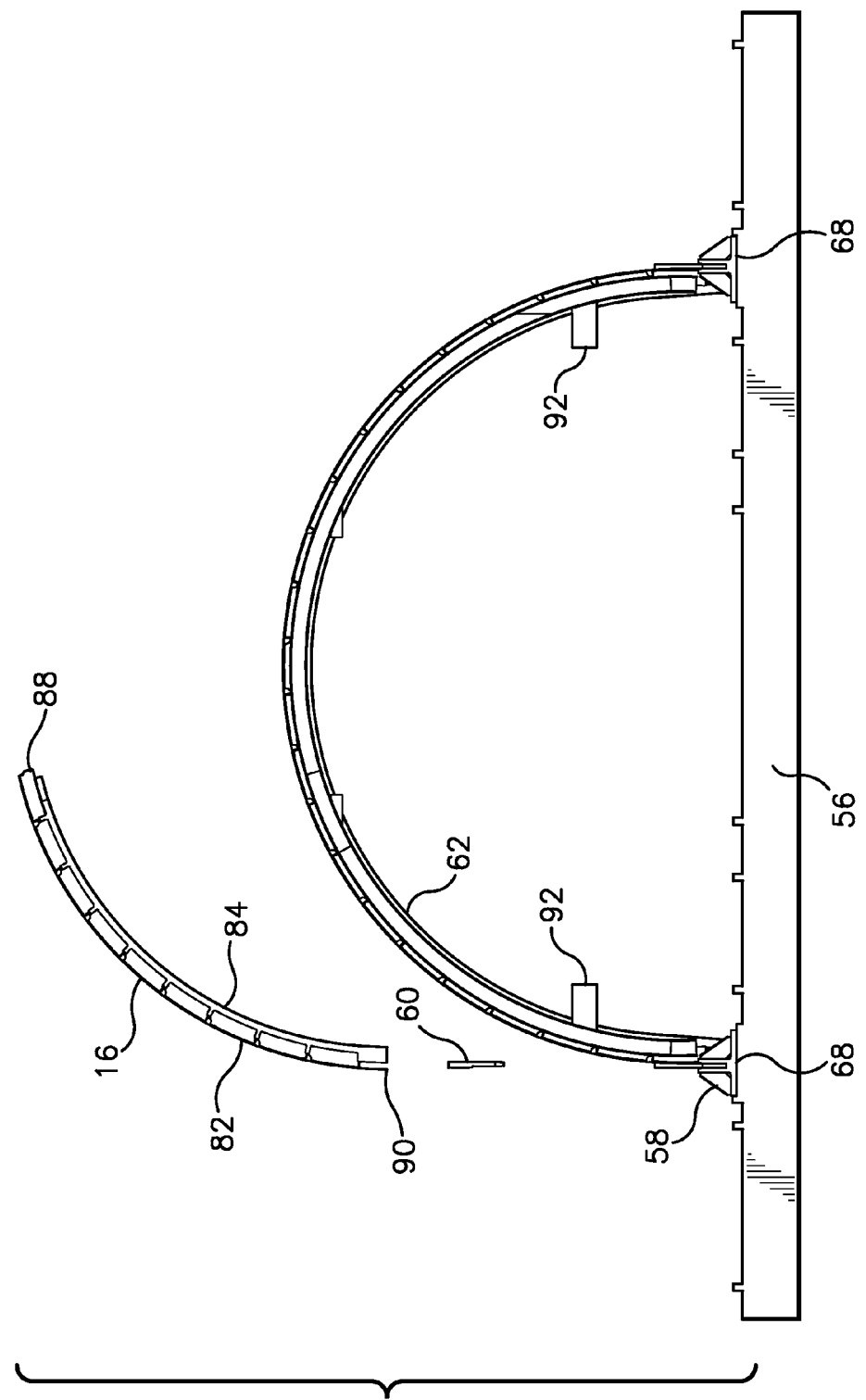
FIG. 6 is an end elevation view of an auxiliary machine of the system configured to attach pairs of the quarter panels together.
Figure 7:
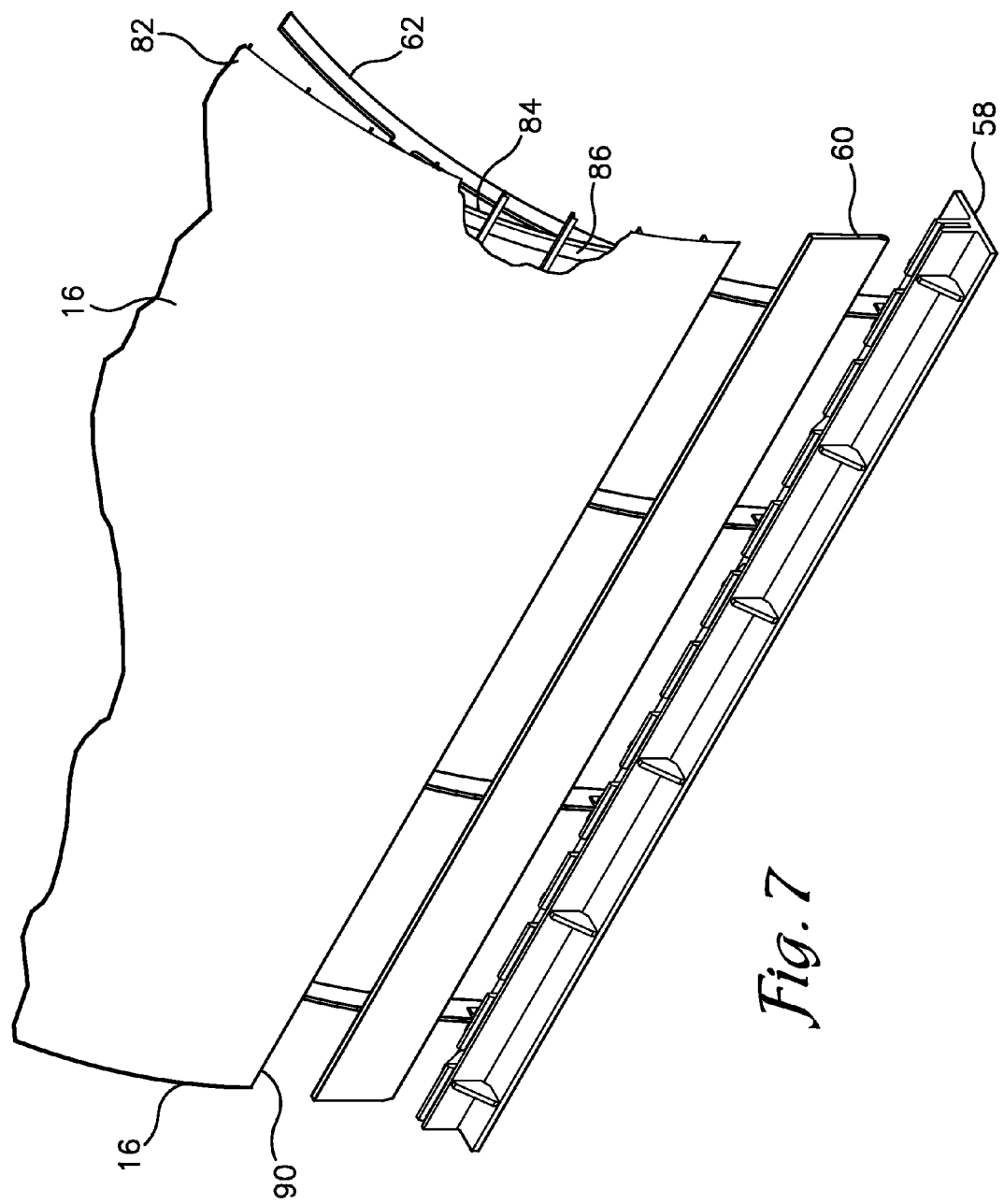
FIG. 7 is a fragmentary exploded perspective view of interface features and an auxiliary support tool of the auxiliary machine of FIG. 6.
Figure 8:
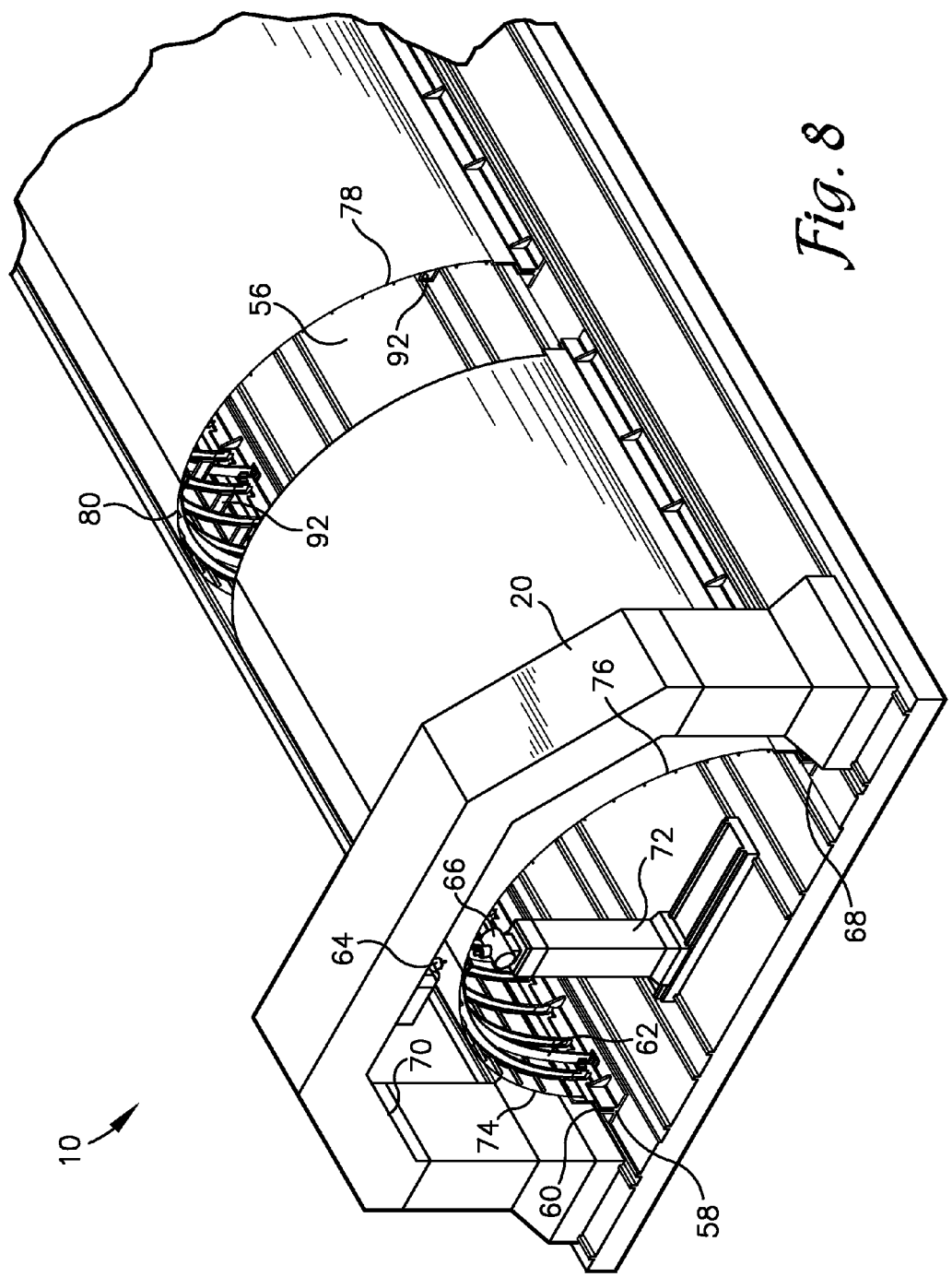
FIG. 8 is a perspective view of the pairs of quarter panels fixed on the auxiliary machine of FIG. 6 with auxiliary drilling implements and auxiliary carriages movably supported on an auxiliary machine bed.
Figure 9:
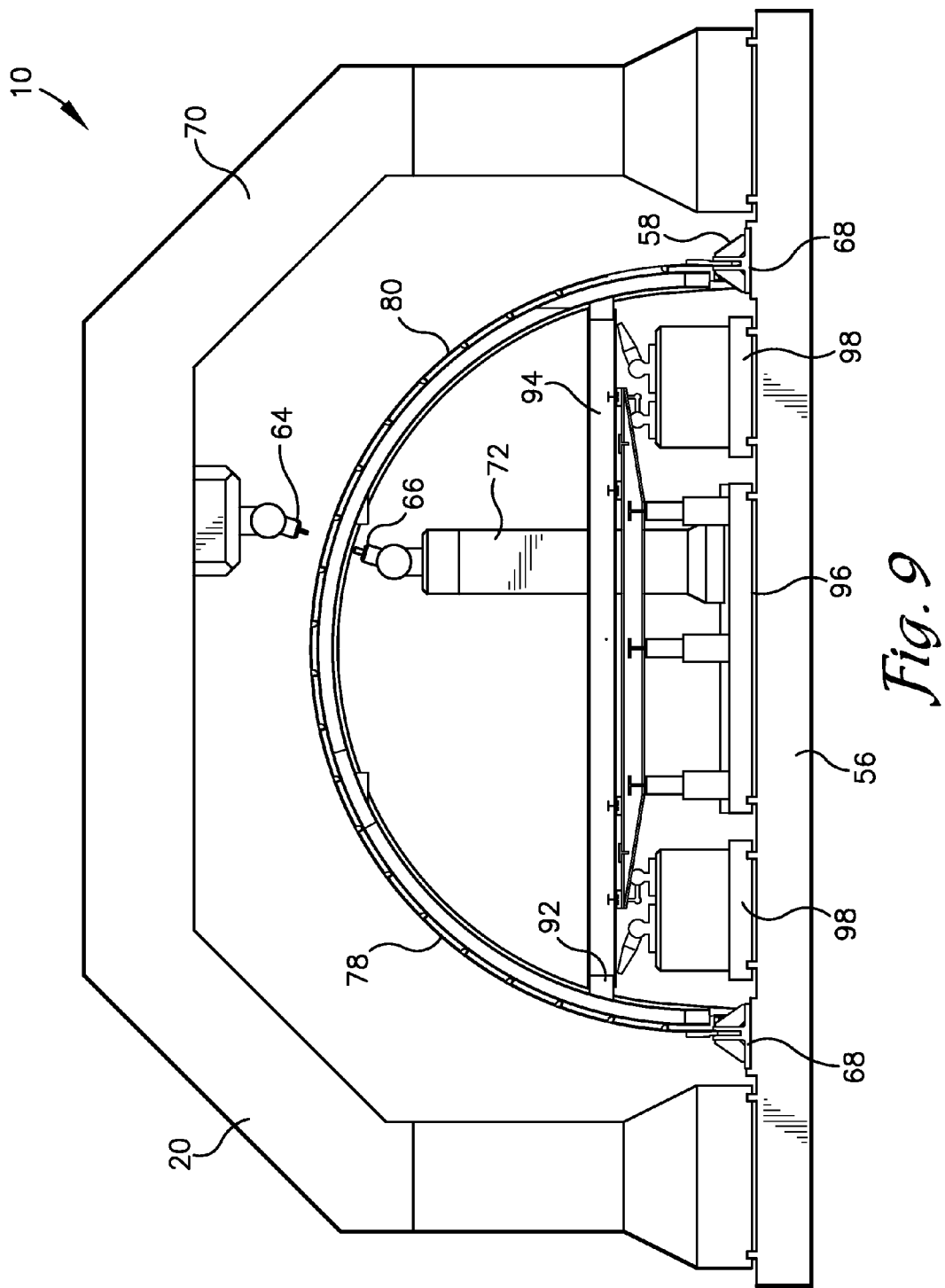
FIG. 9 is an end elevation view of the auxiliary machine of FIG. 8 with additional auxiliary implements for mounting the floor grid to two of the quarter panels.

The auxiliary machine 20, as illustrated in FIGS. 6-9, may be used to properly locate pairs of the aircraft components 16 relative to each other in a partially-overlapping relationship, drill full-sized holes 22 through overlapping portions thereof, and/or insert the fasteners 24 through the full-sized holes 22 formed through the overlapping portions to assemble the pairs of the aircraft components 16. In some embodiments of the invention, the full-sized holes 22 earlier formed with the machine 14 may be used to properly orient the aircraft components 16 relative to the auxiliary machine 20, such as by way of an alignment capture tool component or fastener. The auxiliary machine 20 may comprise an auxiliary machine bed 56, interface features 58,60, auxiliary support headers 62, and auxiliary drilling implements 64,66 actuatable relative to the auxiliary machine bed 56. Furthermore, the auxiliary machine 20 may also comprise an auxiliary control system (not shown) having many of the components and functions of the control system 52 described above. In some embodiments of the invention, as illustrated in FIGS. 8 and 9, the auxiliary machine 20 may be configured to support and assemble multiple pairs of overlapping aircraft components 16 in linear succession and/or join additional structural components thereto, such as a fuselage frame splice plate attached within two partially-overlapping fuselage quarter panels. Additionally, a floor grid of the fuselage may be match drilled but not production fastened to portions of the fuselage, such as the quarter panels, via the auxiliary machine 20, as later described herein.

The auxiliary machine bed 56, as illustrated in FIG. 6, may have pre-determined mounting locations 68 at which the interface features 58,60 may be mounted to the auxiliary machine bed 56. The interface features 58,60 may comprise interface plate tool bed attach features 58 and tool interface plates 60. For example, the interface plate tool bed attach features 58 may comprise a base and an elongated channel formed by flanges extending upward from the base, as illustrated in FIGS. 6 and 7. The tool interface plates 60 may be rigid elongated plates having a first portion configured for insertion into the elongated channels of the interface plate tool bed attach features 58 and a second portion configured for attachment to one of the aircraft components 16, as illustrated in FIG. 7, using alignment capture tool components or any other fasteners.

The auxiliary support headers 62, as illustrated in FIGS. 6-8 may be mechanically or fixedly attached to the interface plate tool bed attach features 58 and may comprise frame pieces matching a desired shape, size, and/or arc-length of the two aircraft components 16 when assembled together, as illustrated in FIG. 8. For example, the auxiliary support headers 62 may comprise a plurality of arched elongated header pieces extending from a first one of the interface plate tool bed attach features 58 and a second one of the interface tool plate bed attach features 58.

The auxiliary drilling implements 64,66 may comprise an upper auxiliary drilling implement 64 and a lower auxiliary drilling implement 66. In some embodiments of the invention, the auxiliary drilling implements 64,66 may also comprise an auxiliary frame drilling implement (not shown) for drilling holes through overlapping portions of the frames of the aircraft components 16 for attachment. The upper auxiliary drilling implement 64 may be aligned with and drill in a direction toward the lower auxiliary drilling implement 66. For example, the lower auxiliary drilling implement 66 may provide an opposing pressure on one side of the skin of the aircraft components 16 while the upper auxiliary drilling implement 64 drills through the overlapping skins. The upper and/or lower auxiliary drilling implements 64,66 may be cooperatively and/or independently actuatable in a plurality of directions. For example, the upper and lower auxiliary drilling implements 64,66 may be actuated fore and aft along a length or y-axis of the auxiliary machine bed 56 and aircraft components 16, may move up and down toward and away from the auxiliary machine bed 56 and aircraft components 16 along a z-axis vertical of the auxiliary machine bed 56, and/or may move side-to-side along a x-axis of the auxiliary machine bed 56. In some embodiments of the invention, the upper and lower auxiliary drilling implements 64,66 may cooperatively operate and be actuatable with up to 6-degrees of freedom.

The upper auxiliary drilling implement 64 may be actuated along a length of the auxiliary machine bed 56 and a length of the aircraft components 16 via a first auxiliary carriage 70 extending over the aircraft components 16 and auxiliary support headers 62 and supported on the auxiliary machine bed 56 at locations outward of the interface features 58,60. For example, the first auxiliary carriage 70 may ride length-wise along two tracks on opposing sides of the interface features 58,60, outward of the aircraft components 16 being joined, as illustrated in FIGS. 8 and 9. The lower auxiliary drilling implement 66 may be actuated along the length of the auxiliary machine bed 56 and a length of the aircraft components 16 via a second auxiliary carriage 72 inward of the auxiliary support headers 62 and interface features 58,60 and therefore housed inward of the aircraft components 16 to be joined by the auxiliary machine 20. For example, the lower auxiliary drilling implement 66 on the second auxiliary carriage 72 may travel length-wise along a track attached to or formed in the auxiliary machine bed 56 between the mounting locations 68 of the auxiliary machine bed 56.

Note that the system 10 as described above and illustrated herein is merely an example embodiment of a system for implementing the method steps detailed below. Other components may be added to or substituted for the system components described above without departing from the scope of the invention.

Fuselage Section Example

In some embodiments of the invention, the aircraft components 16 to be assembled using the system 10 may comprise a plurality of panels, such as four quarter panels 74,76, 78,80 which form one 360-degree section 26 of the aircraft fuselage when assembled together. The quarter panels 74-80 may be of varying sizes. For example, as illustrated in FIGS. 1 and 3, two opposing quarter panels 74,80 may be of a smaller size than their two adjacent quarter panels 76,78. The panels may comprise skin 82 (e.g., cured composite skin), frames 84, stringers 86, shear ties, and/or other structural components of an aircraft fuselage or nacelle and may each have a first skin edge 88 and a second skin edge 90 opposite of the first skin edge 88. For example, the quarter panels 74-80 may include an upper right quarter panel 74, an upper left quarter panel 76, a lower right quarter panel 78, and a lower left quarter panel 80, as illustrated in FIG. 3. The panels may also comprise flooring mount pieces 92 fastened to the frames 84 and/or stringers 86. Furthermore, as illustrated in FIG. 9, the aircraft components 16 may comprise a fuselage floor grid 94 configured to be joined to at least two of the quarter panels 78,80 within the 360-degree section 26 of the aircraft fuselage, via fastening to the flooring mount pieces 92.

In various embodiments of the invention, a method of manufacturing a 360-degree segment of an aircraft structure, such as a fuselage, may broadly include the steps of properly positioning the quarter panels 74-80 relative to the machine datum, drilling full-sized holes 22 proximate to the second skin edge 90 of the quarter panels 74-80, net-trimming the second skin edge 90 of the quarter panels 74-80, then using the full-sized holes 22 proximate to the second skin edges 90 of the quarter panels 74-80 as locating holes or secondary alignment features to properly orient and attach pairs of the quarter panels 74-80 together at or proximate to the first skin edges 88 thereof with the auxiliary machine 20. The method may further comprise drilling full-size holes 22 into overlapping portions of the pairs of quarter panels 74-80 relative to the auxiliary machine datum. Note that the full-sized holes 22 proximate to the second skin edges 90 are oriented on the auxiliary machine 20 to correspond to or be associated with the auxiliary machine datum and attached with the alignment capture tool components or fasteners common to the tool interface plates 60. Then, the method may comprise inserting fasteners 24 through the full-sized holes 22 formed through the overlapping portions of the pairs of quarter panels 74-80, joining the pairs of quarter panels 74-80 into half panels. The fuselage floor grid 94 may also be attached with one of the half panels via the auxiliary machine 20. Next, the method may comprise installing aircraft control systems (not shown) into the half panels and floor grid separately and independently, then bringing the half panels and floor grid 94 together, overlapping portions of the half panels such that the full-sized holes 22 proximate to the second skin edges 90 align. Then the fasteners 24, such as production fasteners may be installed through the aligned full-sized holes 22 proximate to the second skin edges. In some embodiments of the invention, alignment capture tool components may first be inserted through the aligned full-sized holes 22 proximate to the second skin edge 90, thereby allowing the final production fasteners to be installed through the aligned full-sized holes 22. This results in a complete 360-degree segment 26 of the fuselage.

Figure 11:
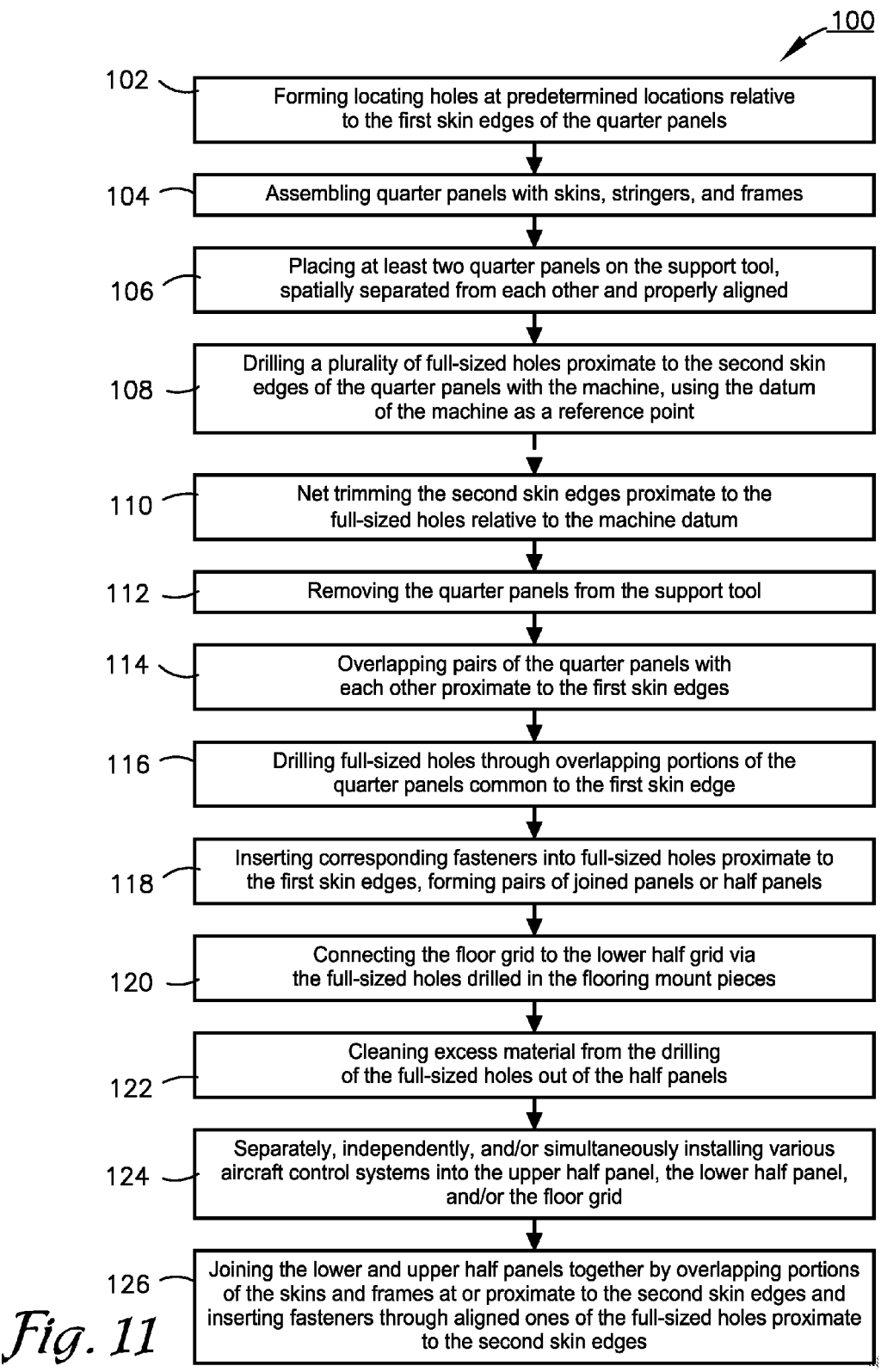
FIG. 11 is a flow chart of a method for assembling a 360-degree section of an aircraft.

The flow chart of FIG. 11 depicts the steps of an exemplary method 100 for manufacturing a 360-degree segment of an aircraft structure, such as the fuselage. Some of the steps of the method may be implemented with the control systems described herein, their computer programs, and/or other components of the system 11. In some alternative implementations, the functions noted in the various blocks may occur out of the order depicted in FIG. 11. For example, two blocks shown in succession in FIG. 11 may in fact be executed substantially concurrently, or the blocks may sometimes be executed in the reverse order depending upon the functionality involved.

According to some embodiments of the invention, as illustrated in FIG. 11, the method 100 of manufacturing the 360-degree segment 26 of an aircraft structure, such as the fuselage, may comprise the steps of forming locating holes 38 or other locating features at predetermined locations relative to skin edges 88,90 of the quarter panels 74-80, as depicted in block 102, and assembling the plurality of panels, such as the quarter panels 74-80 described above and, as depicted in block 104. At least one locating hole 38 may be drilled into the quarter panels 74-80 proximate to the second skin edge 90 at a predetermined distance from the second skin edge 90. The locating holes 38 will be used as datum or reference points for the quarter panels 74-80 during drilling of full-sized holes 22 proximate to the first skin edge 88. For example, there may be two locating holes 38 in each quarter panel, as illustrated in FIG. 3, proximate to the second skin edge 90, and each of the locating holes may be positioned proximate to one or the other of opposing ends of the quarter panel.

The quarter panels 74-80 may be assembled from multiple detailed panels, which may including the skin 82, frames 84, stringers 86, and/or shear ties fastened together. In some embodiments of the invention, the detailed panels may be assembled together into the quarter panels 74-80 using lap join or butt join techniques known in the art. Most of the detailed panels may be trimmed to desired specifications (e.g., net-trimmed) on all four sides or edges at a detail level. At least one of the detailed panels may have a skin edge that is not net trimmed when assembled into a quarter panel. The skin edge that is not net-trimmed may be located at the first skin edge 88 of the quarter panel and the trimmed skin edge of another one of the detailed panels may be located at the second skin edge 90 of the quarter panel located opposite of the first skin edge 88. Once the detailed panels are assembled into the quarter panels 74-80 with the skin 82 and stringers 86, detailed parts such as the frames 84 may be added and mechanically attached to the quarter panels 74-80. At least some of the frames 84 may be loose at end portions near the second skin edge 90 at this point in the assembly process. This means the frame is attached from the first skin edge 88 to a point a predetermined distance away from the second skin edge 90.

The method 100 may further comprise placing at least two of the quarter panels 74-80, spatially separated from each other, on the support tool 12 such that the locating holes 38 or locating features align with the indexing features 36 of the support tool 12, as depicted in block 106 and FIG. 2. As described above, the indexing features 36 of the support tool 12 are oriented with the datum of the machine 14 configured to machine the quarter panels 74-80 at or proximate to the second skin edge 90. For example, the quarter panels 74-80, assembled as described above, may be placed into the support tool 12 using the locating holes 38 of each quarter panel to properly orient the quarter panels 74-80 relative to the support tool 12. As described above, the support tool 12 may be any structure or frame-work having a shape and configuration for supporting the quarter panels 74-80 in place for drilling full-sized holes 22 therein. The support tool 12 may have, for example, at least two portions 28,30 each shaped and configured for supporting one of the quarter panels 74-80 in side-by-side, spaced apart relationship with an adjacent one of the quarter panels 74-80. The space between the two portions 28,30 of the support tool 12 may be sized and configured to allow the machining implements 44-50 of the machine 14 to move between the two portions 28,30 of the support tool 12 resting on the machine bed 42 and two of the quarter panels 76,80 resting on the two portions 28,30 of the support tool 12. The two portions 28,30 may include the first portion 28 and the second portion 30 of the support tool 12, each comprising a frame having a generally curved shape to match the curvature of a corresponding one of the quarter panels 76,80. Because the quarter panels 74-80 may be off different arc-lengths, the first and second portions 28,30 of the support tool 12 may also have different arc lengths to correspond with specific ones of the quarter panels' 74-80 arc-lengths.

In one example embodiment of the invention, the upper right quarter panel 74 may be placed on the first portion 28 of the support tool 12 and the lower right quarter panel 78 may be placed on the second portion 30 of the support tool 12. Indexing features 36 may extend from the first and second portions 28,30 of the support tool 12 and may be positioned and configured to mate with the locating holes 36 of the upper right and lower right quarter panels 74,78. Similarly, the upper left quarter panel 76 may be placed on the second portion 30 of the support tool 12 and the lower left quarter panel 80 may be placed on the first portion 28 of the support tool 12, as illustrated in FIG. 1. The indexing features 36 may extend from the first and second portions 28,30 of the support tool 12 and may be positioned and configured to mate with the locating holes 38 of the upper left and lower left quarter panels 76,80.

In some embodiments of the invention, as illustrated in FIG. 1, the support tool 12 may additionally comprise the third and the fourth portions 32,34 of the support tool 12 shaped and sized substantially identical to the first and/or second portions 28,30 of the support tool. The third and fourth portions 32,34 may also have a space therebetween equal to the space between the first and second portions 28,30. For example, the first and third portions 28,32 may be laterally aligned with each other and the second and fourth portions 30,34 may be laterally aligned with each other such that the machining implements 44-50 may be actuated to move along a single length-wise axis between both the first and second portions 28,30 and the third and fourth portions 32,34 of the support tool. This configuration allow all four portions 28-34 of the support tool 12 to rest on the machine bed 42 simultaneously, such that all four of the quarter panels 74-80 forming the 360-degree section 26 of the aircraft fuselage may have full-sized holes 22 drilled into place and may be at least partially net trimmed all relative to a single datum without moving the quarter panels 74-80. The full-sized holes 22, in this embodiment of the invention, are formed along what will be opposing side joints (formed proximate to the second skin edges 90) of the 360-degree section 26 of the aircraft fuselage.

Figure 10:
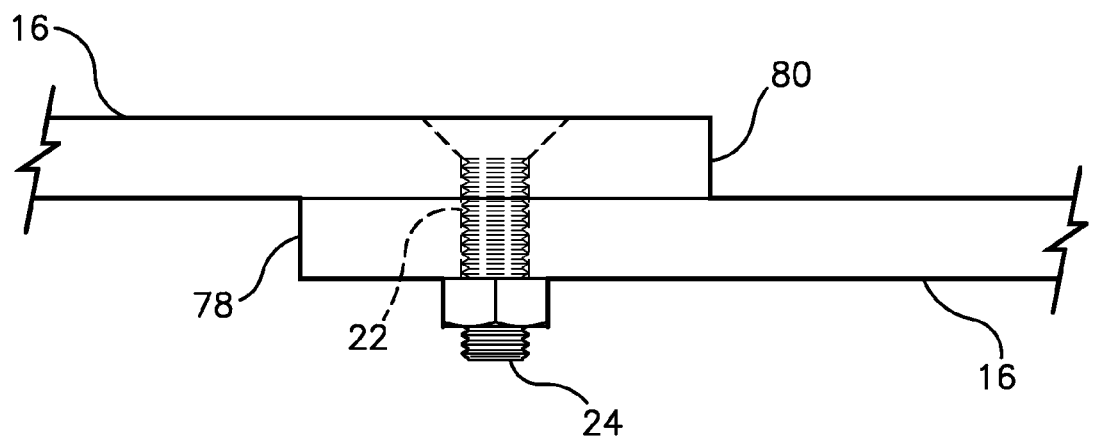
FIG. 10 is a fragmentary elevation view of overlapping portions of the quarter panels of FIG. 3 with a fastener inserted through a full-sized hole drilled by the machine or the auxiliary machine.

Accordingly, the method 100 may further comprise the step of drilling a plurality of full-sized holes 22 proximate to the second skin edges 90 of the quarter panels 74-80 with the machine 14, using the datum of the machine 14 as a reference point, as depicted in block 108. As earlier described herein, the full-sized holes 22 may have a diameter corresponding with a diameter of the fasteners 24 to be placed through the full-sized holes, as illustrated in FIG. 10. For example, the upper and lower right quarter panels 74,78 may be properly placed and positioned on the support tool 12, then the full-sized holes 22 may be drilled therein proximate to the second skin edges 90, and the second skin edges 90 of the upper and lower right quarter panels 74,78 may be net-trimmed with the machining implements 44-50 of the machine 14. In some embodiments of the invention, the upper and lower right quarter panels 74,78 may then be removed from the support tooling 12 and the upper and lower left quarter panels 76,80 may be properly placed and positioned on the support tool 12 such that full-sized holes 22 may be drilled therein proximate to the second skin edge 90. Alternatively, as illustrated in FIG. 1, all four quarter panels 74-80 may rest on the support tool 12 simultaneously and may be simultaneously and/or successively drilled and trimmed at or proximate to the second skin edge 90, as described above, prior to removal of any of the quarter panels 74-80.

Furthermore, drilling full-sized holes 22 proximate to the second skin edges 90 of the quarter panels 74-80 may include drilling full-sized holes 22 into end portions of the frames 84 proximate to the second skin edge 90, as illustrated in FIGS. 2-5, again using the datum of the machine 14 as a reference point. The full-sized holes 22 may be drilled through both the frame 84 and skin 82 simultaneously, with the alignment implement 50 properly aligning the loose ends of the frames 84 relative to the datum of the machine 14. Furthermore, the frame drilling component 48 may also be used to drill full-sized holes 22 substantially perpendicular to the full-sized holes 22 drilled through the skin 82 proximate to the second skin edge 90. As described above, in some embodiments of the invention, the alignment implement 50 and the frame drilling component 48 may be a single integrated component and/or may be mounted on a single arm of the machining implements 44-50. In some embodiments of the invention, the frame drilling component 48 may also be used to drill one or more full-sized holes 22 through the floor mounting pieces 92 relative to the locating holes 38 and machine datum. Note that each of these full-sized holes 22 drilled into the floor mounting pieces 92 and the frames 84 and skin 82 proximate to the second skin edges 90 of the quarter panels 74-80 may be properly located in reference to the machine datum.

Once these full-sized holes 22 are drilled, the method 100 may comprise the steps of net trimming the second skin edge 90 proximate to the full-sized holes 22 relative to the same datum used as a reference for drilling the full-sized holes 22, as depicted in block 110, so minimum tolerance error is introduced, and then removing the quarter panels 74-80 from the support tool 12, as depicted in block 112. Next, the method 100 may comprise the steps of overlapping pairs of the quarter panels 74-80 with each other proximate to the first skin edges 88 thereof, as depicted in block 114, drilling full-sized holes 22 through overlapping portions of the quarter panels 74-80, as depicted in block 116, and inserting corresponding fasteners 24 into these full-sized holes 22, forming a pair of joined panels or half panels, as depicted in block 118. Specifically, as illustrated in FIGS. 6-9, the full-sized holes 22 along the second skin edge 90 may be used as a reference (e.g., datum or locating holes) for drilling the full-sized holes 22 proximate to the first skin edge 88 of each of the quarter panels 74-90. For example, the precise position of overlapping portions of the upper quarter panels 74,76 or overlapping portions of the lower quarter panels 78,80 may be determined by fixing the full-sized holes 22 proximate to the second skin edge 90 at a pre-defined distance from each other, such that the second skin edges 90 are the desired diameter apart and the two upper quarter panels 74,76 or the two lower quarter panels 78,80 form the desired arc-length. In one embodiment of the invention, the full-sized holes 22 proximate to the second skin edges 90 can be attached to the tool interface plates 60 at a predetermined location on the tool interface plates 60 using alignment capture tool components or fasteners. The tool interface plates 60 may then be fixed in the channels of the interface plate tool bed attach features 58 at the mounting locations 68 of the auxiliary machine bed 56. In this way, a datum of the auxiliary machine 20 having a known relationship with the mounting locations 68 of the auxiliary machine bed 56 and therefore a known orientation with the full-sized holes 22 proximate to the second skin edge 90, can be used to determine where to drill full-sized holes 22 through overlapping portions of the upper quarter panels 74,76 and/or overlapping portions of the lower quarter panels 78,80 proximate to their first skin edges 88.

Furthermore, the locating holes 38 proximate to the first skin edges 88, as illustrated in FIG. 3, may be used to help properly position and join the upper quarter panels 74,76 together and the lower quarter panels 78,80 together. For example, the upper left quarter panel 76 and the upper right quarter panel 74 may be placed in overlapping relationship, as illustrated in FIG. 3, such that portions of skin 82 and frames 84 proximate to the first skin edges 88 overlap with each other. Locating holes 38 at opposing ends of the upper right and upper left quarter panels 74,76 may be aligned with each other by inserting pins or bolts therethrough or using tools such as the auxiliary support headers 62 to define half-panel arc-lengths. Then full-sized holes 22 may be drilled and bolts or other fasteners may be inserted therethrough to join the upper right and upper left quarter panels 74,76. This forms an upper half panel and, when repeated for the lower right and left quarter panels 78,80, forms a lower half panel.

In some embodiments of the invention, the method may also comprise the step of connecting the floor grid 94 to one of the half panels via the full-sized holes 22 drilled in the flooring mount pieces 92, as depicted in block 120 and illustrated in FIG. 9. This may occur before or after aircraft control systems are added to the lower half panel and/or in parallel with an application of the prime, decal, and/or corrosion inhibiters, as described below. In one embodiment of the invention, as illustrated in FIG. 9, the floor grid 94 may be attached to the flooring mount pieces 92 via additional auxiliary machining implements 96,98 incorporated into the auxiliary machine. These additional auxiliary machining implements 96,98 may comprise an auxiliary floor grid support tool 96 configured to actuate vertically (y-axis), side to side (x-axis), and/or to and fro (z-axis) to properly orient the floor panel 94 relative to the flooring mount pieces 92 in reference to the auxiliary machine's datum. The additional auxiliary machining implements 96,98 may also comprise auxiliary floor panel drilling implements 98 configured to drill full-sized holes 22 through overlapping portions of the floor grid 94 and the flooring mount pieces 92, such that fasteners or bolts may be placed through these aligned full-sized holes 22 to attach the flooring grid 94 to the flooring mount pieces 92. The auxiliary floor panel drilling implements 98 may also be configured to be actuated relative to the auxiliary machine datum in along a plurality of axes.

Next, the method 100 may comprise cleaning excess material from the drilling of the full-sized holes 22 out of the half panels, as depicted in block 122. This may further involve applying prime, decal, and/or corrosion inhibiters to the half panels. The method may then comprise the step of separately, independently, and/or simultaneously installing various aircraft control systems into the upper half panel and the lower half panel, as depicted in block 124. For example, the control systems may include any of the non-structural components of the fuselage, such as singular, multiple, or assemblies of: supports, sound dampening elements, insulation, tubes, wires, computer components, switches, lights, antennas, and the like. A transportation vehicle (not shown) may be attached through the full-sized holes 22 proximate to the second skin edges 90 to transport the half panels to various stations for aircraft control systems installation. Use of the full-sized holes 22 for transport may advantageously protect these full-sized holes 22 during application of prime, decal, and/or corrosion inhibiters prior to installation of the aircraft control systems.

Once the aircraft control systems are installed into the lower and/or upper half panels, the method 100 may comprise joining the lower and upper half panels together, as depicted in block 126, by overlapping portions of the skins 82 and frames 84 thereof at or proximate to the second skin edges 90 of each of the quarter panels 74-80. Specifically, the full-sized holes 22 proximate to the second skin edges 90 may be aligned, such as with alignment capture tool components, and then fasteners 24, such as bolts, may be inserted therein, with a nut attached to hold the bolts in place, as illustrated in FIG. 10. At this stage in the manufacturing process, the 360-degree section 26 of the fuselage is completely assembled and no additional machining, such as drilling or trimming, is required. The 360-degree section 26 of the fuselage and its control systems can then all be tested as though it was a complete fuselage, prior to being joined with other 360-degree sections of the fuselage. The 360-degree sections of the fuselage may have various indexing features used for joining with the other 360-degree sections to form the completed fuselage.

In general, the method described above provides a unique process for multiple assembly part integration, "enveloping" (aligning or associating) coordinate reference systems or datums of the aircraft components 16, support tool 12, and machine 14 into a single coordinate reference system that defines a distinct spatial corridor of controlled dimensions. This process of a machine adapting to a production assembly-level datum schema allows accurate positioning and drilling of matching full-size holes 22 on spatially separated aircraft components, allowing fastener insertion through the aligned, matching full-size holes later in the assembly of a completed aircraft part. This method provides an induced correct arc length of half a fuselage section without locating tools and allows for complete structural component installation for upper and lower half panels and floor grids in a parallel production sequence.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of manufacturing a segment of an aircraft structure, the method comprising:
    a) assembling a plurality of panels comprising skin and stringers, each panel having a first skin edge and a second skin edge opposite of the first skin edge, with locating holes or locating features formed in the skin at a predetermined location proximate to the first skin edge;
    b) placing at least two of the panels, spatially separated from each other, on a support tool such that the locating holes or locating features align with indexing features of the support tool, wherein the indexing features of the support tool are oriented with a datum of a machine configured to machine the panels;
    c) drilling a plurality of full-sized holes proximate to the second skin edges of the at least two panels with the machine, using the datum of the machine as a reference point, wherein the full-sized holes have a diameter corresponding with a diameter of fasteners to be placed through the full-sized holes;
    d) repeating (b) and (c) on at least two others of the panels;
    e) removing the panels from the support tool;
    f) overlapping two of the panels proximate to their first skin edges, using the full-sized holes proximate to the second skin edges as locating features for determining a precise positioning of the panels relative to each other;
    g) inserting fasteners or pins through the locating holes overlapping each other proximate to the first skin edges of the panels;
    h) drilling full-sized holes through the panels simultaneously at overlapping locations of the panels and inserting corresponding fasteners into the full-sized holes, forming a pair of joined panels;
    i) repeating steps (f) through (h) for two others of the panels;
    j) installing control systems into at least one of the pairs of joined panels; and
    k) attaching the two pairs of joined panels with each other by aligning the full-sized holes proximate to one of the second skin edges with the full-sized holes proximate to another of the second skin edges and inserting fasteners through the aligned full-sized holes.

2. The method of claim 1, further comprising the step of trimming the second skin edge after the drilling step (c).

3. The method of claim 1, further comprising the step of mechanically attaching a plurality of frames to each of the panels prior to step (b).

4. The method of claim 3, wherein an end portion of each of the frames proximate to the second skin edge remains loose and unattached to the skin prior to step (k).

5. The method of claim 3, further comprising the step of drilling full-sized holes into end portions of the frames proximate to the second skin edge, using the datum of the machine as a reference point, prior to step (e).

6. The method of claim 5, wherein the end portion of each of the frames proximate to the second skin edge remains loose and unattached to the skin prior to step (k), further comprising the step of properly aligning the loose ends of the frames, relative to the datum of the machine with, an alignment implement of the machine prior to drilling full-sized holes into the end portions of the frames.

7. The method of claim 1, further comprising the step of drilling full-sized floor grid attach holes into the panels with the machine, using the datum of the machine as a reference point, prior to step (e).

8. The method of claim 1, further comprising drilling full-sized floor grid attach holes into two of the panels and the floor grid and inserting fasteners through the full-sized floor grid attach holes, thereby fixing the floor grid with one of the pairs of joined panels.

9. The method of claim 1, wherein step (f) further comprises attaching the full-sized holes proximate to the second skin edges of the panels at fixed locations on a bed of an auxiliary machine, wherein the auxiliary machine determines a location of the full-sized holes at the overlapping locations proximate to the first skin edges based on an auxiliary datum of the auxiliary machine associated with the fixed locations at which the full-sized holes proximate to the second skin edges are attached to the bed of the auxiliary machine.

10. A method of manufacturing a segment of an aircraft structure, the method comprising:
    a) assembling a plurality of panels comprising skin and stringers, each panel having a first skin edge and a second skin edge opposite of the first skin edge;
    b) net trimming the panels on all but the second skin edge;
    c) forming locating holes or locating features at a predetermined location proximate to the first skin edge;
    d) placing at least two of the panels on separate portions of a support tool such that the locating holes or locating features align with indexing features of the support tool, wherein the separate portions of the support tool comprise a first portion and a second portion, wherein the indexing features of the support tool are oriented with a datum of a machine configured to machine the panels, wherein the first and second portions of the support tool are spatially separated from each other;
    e) drilling a plurality of full-sized holes proximate to the second skin edges of the at least two panels with the machine, using the datum of the machine as a reference point, wherein the full-sized holes have a diameter corresponding with a diameter of fasteners to be placed through the full-sized holes;
    f) trimming the second skin edges of the at least two panels with the machine, using the datum of the machine as a reference point;
    g) repeating (d) through (f) on at least two others of the panels;
    h) removing the panels from the support tool;
    i) overlapping two of the panels proximate to their first skin edges, using the full-sized holes proximate to the second skin edges as locating features for determining a precise positioning of the panels relative to each other;
    j) inserting fasteners or pins through the locating holes overlapping each other proximate to the first skin edges of the panels;
    k) drilling full-sized holes through the panels simultaneously at overlapping locations of the panels and inserting corresponding fasteners into the full-sized holes;
    l) repeating steps (i) through (k) for two others of the panels, such that two pairs of joined panels are formed;
    m) installing control systems into at least one of the pairs of joined panels; and
    n) attaching the two pairs of joined panels with each other by overlapping the second skin edges such that the full-sized holes proximate to one of the second skin edges are aligned with the full-sized holes proximate to another of the second skin edges and inserting fasteners through the aligned full-sized holes.

11. The method of claim 10, further comprising the step of mechanically attaching a plurality of frames to each of the panels prior to step (d).

12. The method of claim 11, wherein an end portion of each of the frames proximate to the second skin edge remains loose and unattached to the skin prior to step (n).

13. The method of claim 11, further comprising the step of drilling full-sized holes into end portions of the frames proximate to the second skin edge, using the datum of the machine as a reference point, prior to step (h).

14. The method of claim 13, wherein the end portion of each of the frames proximate to the second skin edge remains loose and unattached to the skin prior to step (n), further comprising the step of properly aligning the end portions of the frames, relative to the datum of the machine, with an alignment implement of the machine prior to drilling full-sized holes into the end portions of the frames or drilling the full-sized holes proximate to the second skin edge of the panels.

15. The method of claim 10, further comprising the step of drilling full-sized floor grid attach holes into the panels with the machine, using the datum of the machine as a reference point, prior to step (h).

16. The method of claim 10, further comprising drilling full-sized floor grid attach holes into two of the panels and the floor grid and inserting fasteners through the full-sized floor grid attach holes, thereby fixing the floor grid with one of the pairs of joined panels.

17. The method of claim 10, wherein step (i) further comprises attaching the full-sized holes proximate to the second skin edges of the panels at fixed locations on a bed of an auxiliary machine, wherein the auxiliary machine determines a location of the full-sized holes at the overlapping locations proximate to the first skin edges based on an auxiliary datum of the auxiliary machine associated with the fixed locations at which the full-sized holes proximate to the second skin edges are attached to the bed of the auxiliary machine.

18. A method of manufacturing a 360-degree segment of an aircraft fuselage, the method comprising:
a) assembling four quarter panels comprising skin and stringers, each quarter panel having a first skin edge and a second skin edge opposite of the first skin edge, wherein the quarter panels comprise an upper right quarter panel, a lower right quarter panel, an upper left quarter panel, and a lower left quarter panel;
b) net trimming the quarter panels on all but the second skin edge;
c) forming locating holes or locating features at a predetermined location proximate to the first skin edge;
d) placing the upper right quarter panel and the lower right quarter panel on first and second portions of a support tool such that the locating holes or locating features align with indexing features of the support tool, wherein the indexing features of the support tool are oriented with a datum of a machine configured to machine the panels, wherein the first and second portions of the support tool are spatially separated from each other such that the second skin edges of the upper and lower right quarter panels are spatially separated from each other;
e) drilling a plurality of full-sized holes proximate to the second skin edges of the upper and lower right quarter panels with the machine, using the datum of the machine as a reference point, wherein the full-sized holes have a diameter corresponding with a diameter of fasteners to be placed through the full-sized holes;
f) trimming the second skin edges of the upper and lower right quarter panels with the machine, using the datum of the machine as a reference point;
g) placing the upper left quarter panel and the lower left quarter panel on third and fourth portions of the support tool, or placing the upper left quarter panel and the lower left quarter panel on the first and second portions of the support tool after removing the upper and lower right quarter panels from the first and second portions of the support tool, aligning locating holes or locating features with the indexing features of the support tool, wherein the third and fourth portions of the support tool are spatially separated from each other such that the second skin edges of the upper and lower left quarter panels are spatially separated from each other if supported by the third and fourth portions of the support tool;
h) drilling a plurality of full-sized holes proximate to the second skin edges of the upper and lower left quarter panels with the machine, using the datum of the machine as a reference point;
i) trimming the second skin edges of the upper and lower left quarter panels with the machine, using the datum of the machine as a reference point;
j) removing the quarter panels from the support tool;
k) overlapping a portion of the upper left quarter panel with the upper right quarter panel proximate to their first skin edges, using the full-sized holes proximate to the second skin edges as locating features for determining a precise positioning of the upper right and left quarter panels relative to each other;
l) inserting fasteners or pins through the locating holes of the upper left and right quarter panels overlapping each other proximate to the first skin edges of the upper left and right quarter panels;
m) drilling full-sized holes through the upper right and left quarter panels simultaneously at overlapping locations of the upper right and left quarter panels and inserting corresponding fasteners into the full-sized holes at the overlapping locations of the upper right and left quarter panels, forming an upper section of the fuselage;
n) overlapping a portion of the lower left quarter panel with the lower right quarter panel proximate to their first skin edges, using the full-sized holes proximate to the second skin edges as locating features for determining a precise positioning of the lower right and left quarter panels relative to each other;
o) inserting fasteners or pins through the locating holes of the lower left and right quarter panels overlapping each other proximate to the first skin edges of the lower left and right quarter panels;
p) drilling full-sized holes through the lower right and left quarter panels simultaneously at overlapping locations of the lower right and left quarter panels and inserting corresponding fasteners into the full-sized holes at the overlapping locations of the lower right and left quarter panels, forming a lower section of the fuselage;
q) independently installing control systems into the upper section and the lower section of the fuselage; and
r) attaching the upper section and the lower section of the fuselage with each other by overlapping the second skin edges such that the full-sized holes proximate to one of the second skin edges are aligned with the full-sized holes proximate to another one of the second skin edges and inserting fasteners through the aligned full-sized holes.

19. The method of claim 18, further comprising the steps of:
- mechanically attaching a plurality of frames to each of the quarter panels prior to placing the quarter panels onto the support tool, wherein an end portion of each of the frames proximate to the second skin edge remains loose and unattached to the skin prior to step (r); and
- drilling full-sized holes into the end portions of the frames proximate to the second skin edge, using the datum of the machine as a reference point, prior to step (j).

20. The method of claim 19, further comprising the step of properly aligning the end portions of the frames, relative to the datum of the machine, an alignment implement of the machine prior to drilling full-sized holes into the end portions of the frames or drilling the full-sized holes proximate to the second skin edges of the quarter panels.

\* \* \* \* \*

UNITED STATES PATENT AND TRADEMARK OFFICE
CERTIFICATE OF CORRECTION

PATENT NO. : 8,914,979 B2  Page 1 of 1
APPLICATION NO. : 13/553946
DATED : December 23, 2014
INVENTOR(S) : Venskus et al.

It is certified that error appears in the above-identified patent and that said Letters Patent is hereby corrected as shown below:

Title page

Item (73) Assignee: Delete "SPIRIT ACROSYSTEMS, INC.," and insert
--SPIRIT AEROSYSTEMS, INC.,--.

Signed and Sealed this
Twenty-second Day of September, 2015

Michelle K. Lee
*Director of the United States Patent and Trademark Office*